(12) United States Patent
Lu

(10) Patent No.: US 11,502,510 B2
(45) Date of Patent: Nov. 15, 2022

(54) ELECTRONIC CIRCUIT PROTECTOR

(71) Applicant: Chao-Cheng Lu, Taipei (TW)

(72) Inventor: Chao-Cheng Lu, Taipei (TW)

( * ) Notice: Subject to any disclaimer, the term of this patent is extended or adjusted under 35 U.S.C. 154(b) by 0 days.

(21) Appl. No.: 17/395,741

(22) Filed: Aug. 6, 2021

(65) Prior Publication Data

US 2022/0337053 A1 Oct. 20, 2022

(30) Foreign Application Priority Data

Apr. 16, 2021 (TW) .................................. 110113676

(51) Int. Cl.
*H02H 9/02* (2006.01)
*H02H 9/04* (2006.01)

(52) U.S. Cl.
CPC ............ *H02H 9/025* (2013.01); *H02H 9/046* (2013.01)

(58) Field of Classification Search
CPC ............................... H02H 9/025; H02H 9/046

USPC .......................................................... 361/93.9
See application file for complete search history.

(56) References Cited

U.S. PATENT DOCUMENTS

| | | | |
|---|---|---|---|
| 2006/0285263 A1* | 12/2006 | Chen ................... | H01L 27/0285 361/56 |
| 2010/0277847 A1* | 11/2010 | Li .......................... | H02H 3/087 361/111 |
| 2015/0055271 A1* | 2/2015 | Chen ..................... | H01H 47/325 361/205 |
| 2017/0256939 A1* | 9/2017 | Logiudice .............. | H02H 9/046 |
| 2020/0083705 A1* | 3/2020 | Xavier ................ | H01L 27/0285 |

\* cited by examiner

*Primary Examiner* — Dharti H Patel
(74) *Attorney, Agent, or Firm* — Muncy, Geissler, Olds & Lowe, P.C.

(57) ABSTRACT

The electronic circuit protector of the invention comprises a first semiconductor, a second semiconductor, a third semiconductor, a first diode, a second diode, a first resistor, a second resistor and a third resistor, constituting an application circuit with load overload or short circuit protection function, which avoids the damage caused by overload or short circuit at both terminals of the load.

13 Claims, 2 Drawing Sheets

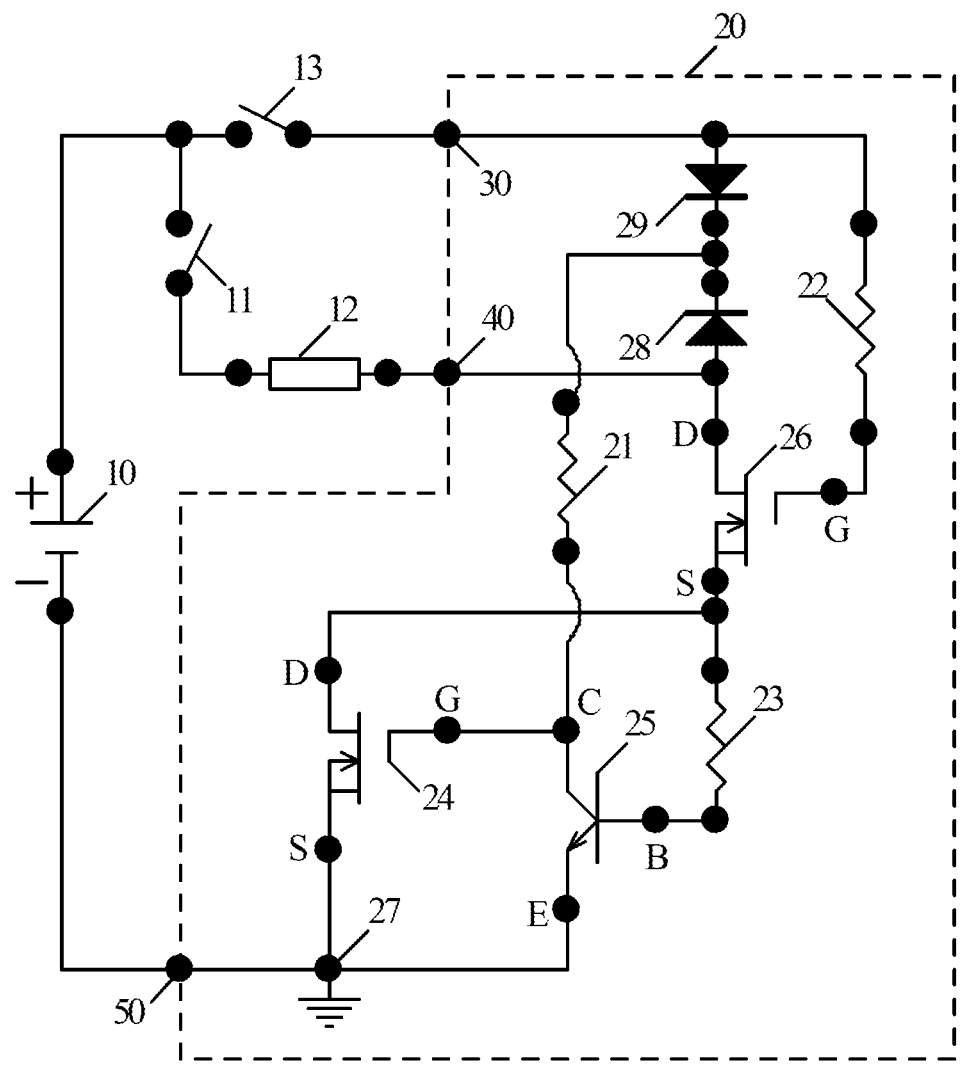
F I G . 1

ELECTRONIC CIRCUIT PROTECTOR

FIELD OF THE INVENTION

The present disclosure relates to the field of electronic technology, particularly, to an electronic circuit protector having the function of protecting the DC power supply when overload or short-circuit occurs at both ends of the load during the application of a DC circuit and including a first semiconductor, a second semiconductor, a third semiconductor, a first diode, a second diode, and a first resistor, a second resistor, and a third resistor.

BACKGROUND OF THE INVENTION

The electronic circuit protector of the present invention has been searched by the inventor for related electronic circuit protectors and related electronic protector invention documents, but no same or similar technology as the electronic circuit protector of the present invention has been found; In particular, the technical means of connecting the third semiconductor and the first semiconductor in series in the electronic circuit protector of the present invention to achieve the function of protecting the DC power supply when the load is overloaded or short-circuited in the application process of the DC circuit, is an unprecedented original invention in the world. Other circuit features are described in detail in the specification of the present invention.

SUMMARY OF THE INVENTION

The objectives of the present disclosure are as follows:

The electronic circuit protector of the present invention applies a first semiconductor, a second semiconductor, a third semiconductor, a first diode, a second diode, a first resistor, a second resistor, and a third resistor, such that the DC power supply can be protected when the load overload or short circuit occurs in the DC circuit during power supply.

When the load is short-circuited, the electronic circuit protector of the present invention applying the second semiconductor can perform the first semiconductor open-circuit action in a very short time, achieving the function of protecting the DC power circuit and avoiding various kinds of disasters caused by the short-circuited load.

The third semiconductor of the electronic circuit protector of the present invention operates in a way such that when the electronic circuit protector of the present invention is turned on, the load is powered by a DC power supply, and when the electronic circuit protector of the present invention is turned off, the load is not powered by the DC power supply.

When the electronic circuit protector of the present invention is turned on, the first semiconductor is conducted first, and then the third semiconductor is conducted. That is to say, when the electronic circuit protector of the present invention is turned on, the conduction time of the first semiconductor is earlier than the conduction time of the third semiconductor.

The electronic circuit protector of the present invention has characteristics as follows:

1. The first semiconductor and the third semiconductor of the electronic circuit protector of the present invention have the characteristic of being connected in series and are responsible for open circuiting and conduction of the DC power supply to supply power to the load.

2. The second semiconductor of the electronic circuit protector of the present invention is responsible for controlling the open circuit and conduction actions of the first semiconductor to achieve the purpose of protecting the DC power supply circuit when a short circuit occurs at both ends of the load.

3. The first diode and the second diode of the electronic circuit protector of the present invention are responsible for providing power to the gate or base of the first semiconductor.

4. The electronic circuit protector of the present invention is provided with a first resistor with a current limiting function to prevent the first semiconductor from being damaged due to excessive gate or base current.

5. The electronic circuit protector of the present invention is equipped with a first resistor with a current limiting function to prevent the second semiconductor from being damaged due to excessive current in the collector and emitter.

6. The electronic circuit protector of the present invention is provided with a second resistor with a current limiting function to prevent the third semiconductor from being damaged due to excessive gate current.

7. The electronic circuit protector of the present invention is provided with a third resistor with a current limiting function to prevent the second semiconductor from being damaged due to excessive current in the gate or base of the second semiconductor.

8. The electronic circuit protector of the present invention is provided with a circuit composed of a first semiconductor, a second semiconductor and a third resistor such that the first semiconductor has a self-protection function.

9. The first semiconductor of the electronic circuit protector of the present invention includes N Channel Metal Oxide Semiconductor Field Effect Transistors (N Channel MOSFET), N Type Transistors or an Insulated Gate Bipolar Transistors (IGBT), any or combination thereof can be selected according to needs.

10. The second semiconductor of the electronic circuit protector of the present invention includes N-channel metal oxide semiconductor field effect transistors, N-type transistors or insulated gate bipolar transistors, any or combination thereof can be selected according to needs.

11. The third semiconductor of the electronic circuit protector of the present invention includes N-channel metal oxide semiconductor field effect transistors or insulated gate bipolar transistors.

BRIEF DESCRIPTION OF THE DRAWINGS

FIG. 1 shows a first embodiment of the electronic circuit protector of the present invention.

DETAILED DESCRIPTION OF THE PREFERRED EMBODIMENTS

Figure 2:
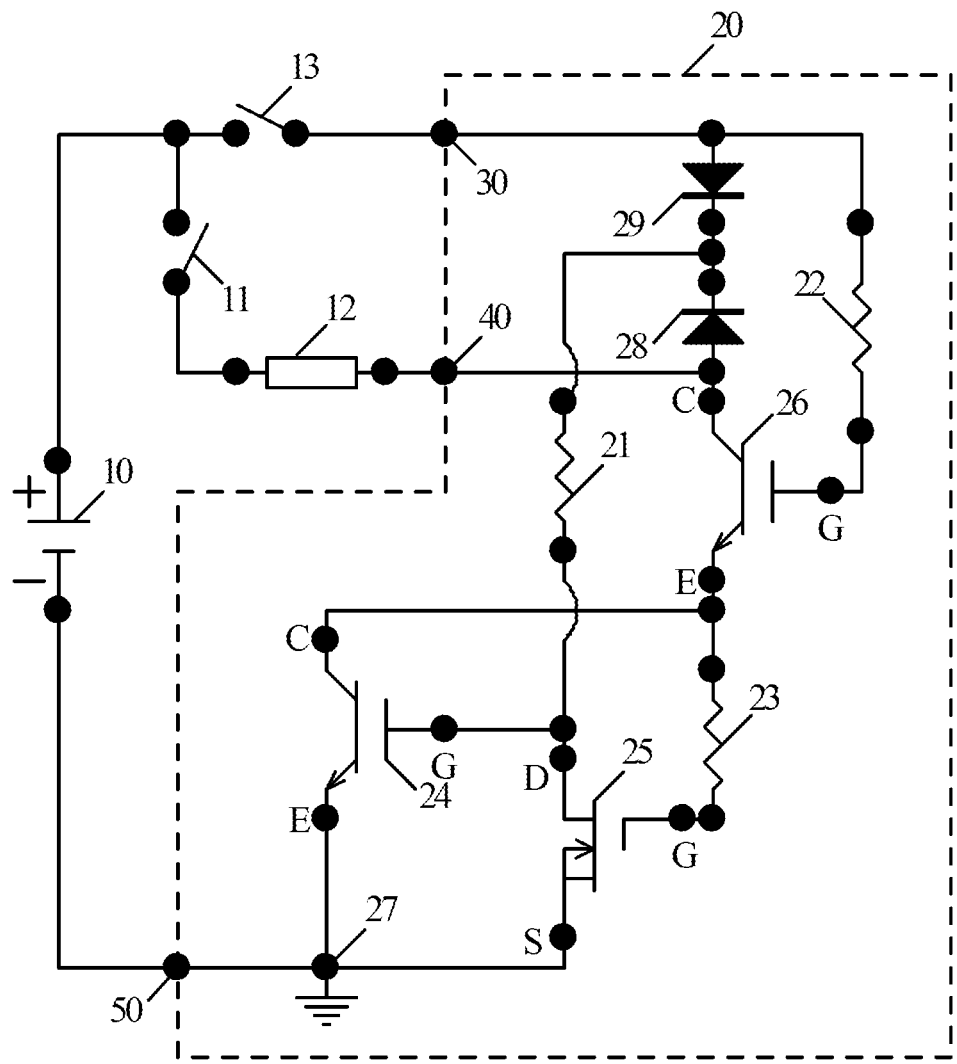
FIG. 2 shows a second embodiment of the electronic circuit protector of the present invention.

As shown in FIG. 1, it is a first embodiment of the electronic circuit protector of the present invention. As can be seen from the figure, the electronic circuit protector 20 of the present invention includes a first semiconductor 24, a second semiconductor 25, a third semiconductor 26, a first diode 28, a second diode 29, a first resistor 21, a second resistor 22 and a third resistor 23.

A DC power supply 10 is connected to a first switch 11, the first switch 11 is connected to the first end of the load 12, and the second end of the load 12 is connected to the second terminal 40, the drain D of the third semiconductor 26 and the anode terminal of the first diode 28, the cathode terminal of the first diode 28 is connected to the first end of the first resistor 21, and the second end of the first resistor 21 is connected to the gate G and the collector C of the second semiconductor 25.

The DC power supply 10 is connected to a first end of a second switch 13, the second end of the second switch 13 is connected to a first terminal 30, the anode terminal of the second diode 29 and a first end of the second resistor 22, the cathode terminal of the second diode 29 is connected to a first end of the first resistor 21, and the second end of the second resistor 22 is connected to the gate G of the third semiconductor 26.

The emitter E of the second semiconductor 25 and the source S of the first semiconductor 24 are connected to become a ground terminal 27 or a third terminal 50 connected to the negative terminal of the DC power supply 10.

The first terminal of the first switch 11 and the first terminal of the second switch 13 are connected to the positive terminal of the DC power supply 10, and the negative terminal of the DC power supply 10 is connected to the third terminal 50 and the ground terminal 27.

As shown in FIG. 1, the first switch 11 is conducted first, and then the second switch 13 is conducted, equivalently conducting the electronic circuit protector of the present invention, and the load 12 is powered by the DC power supply 10.

As shown in FIG. 1, when the first switch 11 is conducted, and then the second switch 13 is open circuited, equivalently turning off the electronic circuit protector of the present invention, and the DC power supply 10 does not supply power to the load 12.

When both ends of the load 12 are short-circuited, according to the Output Characteristics of the first semiconductor 24, it can be known that when the Drain Current of the first semiconductor 24 rises such that its corresponding Drain Source Voltage reaches above the turn-on voltage of the second semiconductor 25 and therefore supplies power to the base B of the second semiconductor 25, at this time, the collector C and the emitter E of the second semiconductor 25 are conducted, so the drain D and the source S of the first semiconductor 24 are open-circuited, the DC power supply 10 not supplying power to the short-circuit load 12, hence protecting the DC power supply 10; likewise, the resistance value of the third resistor 23 and the turn-on voltage value between the drain D and the source S of the first semiconductor 24 can be appropriately selected, so that the overload protection function can also be achieved by accommodating the overload drain current required by the first semiconductor 24.

When the first semiconductor 24 has an excessive drain current or a short-circuit current is caused by a short circuit of the load 12, the collector C and the emitter E of the second semiconductor 25 are turned on, and the drain D and the source S of the first semiconductor 24 are open-circuited. This means that the first semiconductor 24 has its own protection function.

As shown in FIG. 2, it is a second embodiment of the electronic circuit protector of the present invention. As can be seen from the figure, the first semiconductor 24 in FIG. 1 is changed from an N-channel metal oxide semiconductor field effect transistor to an insulated gate bipolar transistor, the second semiconductor 25 is changed from an N-type transistor to an N-channel metal oxide semiconductor field effect transistor, and the third semiconductor 26 is changed from an N-channel metal oxide semiconductor field effect transistor to an insulated gate bipolar transistor, while the rest of the circuit structure remain the same as in FIG. 1 and thus will not be reiterated.

As shown in FIG. 2, the first switch 11 is conducted first, and the second switch 13 is then conducted, equivalently turning on the electronic circuit protector of the present invention, and the load 12 is powered by the DC power supply 10.

As shown in FIG. 2, the first switch 11 is conducted, and the second switch 13 is then open-circuited, equivalently turning off the electronic circuit protector of the present invention, and the DC power supply 10 does not supply power to the load 12.

When the two ends of the load 12 are short-circuited, according to the output characteristics of the first semiconductor 24, it can be known that when the Collector Current of the first semiconductor 24 rises such that its corresponding Collector Emitter Voltage reaches above the turn-on voltage of the second semiconductor 25 and therefore supplies power to the gate G of the second semiconductor 25, at this time, the drain D and the source S of the second semiconductor 25 are conducted, so the collector C and the emitter E of the first semiconductor 24 open-circuited, the DC power supply 10 does not supply power to the short-circuit load 12, hence protecting the DC power supply 10; likewise, the resistance value of the third resistor 23 and the turn-on voltage between drain D and source S of the second semiconductor 25 can be appropriately selected, so that the function of overload protection can also be achieved by accommodating the overload collector current required by the first semiconductor 24.

When the first semiconductor 24 has an excessive collector current or a short circuit current is caused by a short circuit of the load 12, the collector C and the emitter E of the first semiconductor 24 are open-circuited, which means that the first semiconductor 24 has its own protection function.

It can be seen from FIG. 2 that the first semiconductor 24 in FIG. 1 is changed from an N-channel metal oxide semiconductor field-effect transistor to an insulated gate bipolar transistor. The operation principle is the same, and the function of protecting the DC power supply 10 when the load 12 is short-circuited is also the same.

It can be seen from the aforementioned FIG. 2 that the first semiconductor 24 in FIG. 2 can also be changed from an insulated gate bipolar transistor to an N-type transistor. The operation principle is the same, and the function of protecting the DC power supply 10 when the load 12 is short-circuited is also the same.

It can be seen from the aforementioned FIG. 2 that the second semiconductor 25 in FIG. 1 is changed from an N-type transistor to an N-channel metal oxide semiconductor field effect transistor, and the second semiconductor 25 in FIG. 2 can also be changed from an N-channel metal oxide semiconductor field-effect transistor to an insulated gate bipolar transistor. The operation principle is the same, and the selection is based on requirements and not self-limiting.

It can be seen from the aforementioned FIG. 2 that the third semiconductor 26 in FIG. 1 is changed from an N-channel metal oxide semiconductor field-effect transistor to an insulated gate bipolar transistor. The operation principle is the same, and the selection is based on requirements and not self-limiting.

It can be seen from the above that when the electronic circuit protector of the present invention is turned on, the first semiconductor 24 is conducted first, and the third semiconductor 26 is conducted later, that is to say, when the electronic circuit protector of the present invention is turned on, the conduction time of the first semiconductor 24 is earlier than the conduction time of the third semiconductor 26.

It can be seen from the above that when the load 12 is overloaded or short-circuited in the present invention, the drain (or collector) and source (or emitter) of the second semiconductor 25 are turned on first, and the drain (or collector) and source (or emitter) of the first semiconductor 24 are subsequently open-circuited.

It can be seen that the present invention can be implemented based on the operation principles and functional actions described above.

What is claimed is:

1. An electronic circuit protector, comprising:
    a first semiconductor having a drain, a source and a gate;
    a second semiconductor having a drain, a source, and a gate, wherein the drain of the second semiconductor is connected to the gate of the first semiconductor, and the source of the second semiconductor is connected to the source of the first semiconductor to become a third terminal;
    a third semiconductor having a drain, a source and a gate, wherein the source of the third semiconductor is connected to the drain of the first semiconductor;
    a first diode having an anode terminal and a cathode terminal, wherein the anode terminal is connected to the drain of the third semiconductor to become a second terminal;
    a second diode having an anode terminal and a cathode terminal, the cathode terminal of the second diode is connected to the cathode terminal of the first diode;
    a first resistor having a first end and a second end, wherein the first end is connected to the cathode terminal of the first diode and the cathode terminal of the second diode, and the second end is connected to the gate of the first semiconductor and the drain of the second semiconductor;
    a second resistor having a first end and a second end, wherein the first end of the second resistor is connected to the anode terminal of the second diode to become a first terminal, and the second end of the second resistor is connected to the gate of the third semiconductor; and
    a third resistor having a first end and a second end, wherein the first end of the third resistor is connected to the drain of the first semiconductor and the source of the third semiconductor, and the second end of the third resistor is connected to the gate of the second semiconductor.

2. The electronic circuit protector according to claim 1, wherein the first semiconductor or the second semiconductor is an N-channel metal oxide semiconductor field-effect transistor, an N-type transistor or an insulated gate bipolar transistor.

3. The electronic circuit protector according to claim 1, wherein the third semiconductor system is an N-channel metal oxide semiconductor field-effect transistor or an insulated gate bipolar transistor.

4. The electronic circuit protector according to claim 1, wherein the first diode and the second diode have a function of supplying the gate voltage of the first semiconductor.

5. The electronic circuit protector according to claim 1, wherein the drain of the first semiconductor is connected to the source of the third semiconductor, and the first semiconductor and the third semiconductor have a function of being connected in series.

6. The electronic circuit protector according to claim 1, wherein the first terminal is connected to the positive terminal of a DC power supply, and the third terminal is connected to the negative terminal of the DC power supply.

7. The electronic circuit protector according to claim 6, wherein the second terminal is connected to the second terminal of a load, and the first terminal of the load is connected to the positive terminal of the DC power supply.

8. The electronic circuit protector according to claim 7, wherein the sequence of actions of the first semiconductor and the second semiconductor when the load is overloaded or short-circuited is:
    the drain and the source of the second semiconductor are conducted first, and the drain and the source of the first semiconductor are conducted subsequently.

9. The electronic circuit protector according to claim 1, wherein when the first semiconductor and the third semiconductor are turned on, the sequence of actions in time thereof is: the drain and the source of the first semiconductor are conducted first, and the drain and the source of the third semiconductor are conducted subsequently.

10. The electronic circuit protector according to claim 1, wherein the circuit formed by the first semiconductor, the second semiconductor and the third resistor causes the first semiconductor to have a self-protecting function.

11. The electronic circuit protector according to claim 1, wherein the drain of the first semiconductor can be replaced by a collector, and the source of the first semiconductor can be replaced by an emitter, and the gate of the first semiconductor can be replaced by a gate.

12. The electronic circuit protector according to claim 1, wherein the drain of the second semiconductor can be replaced by a collector, the source of the second semiconductor can be replaced by an emitter, and the gate of the second semiconductor can be replaced by a gate.

13. The electronic circuit protector according to claim 1, wherein the drain of the third semiconductor can be replaced by a collector, the source of the third semiconductor can be replaced by an emitter, and the gate of the third semiconductor can be replaced by a gate.

* * * * *